(12) United States Patent
Fetcenko et al.

(10) Patent No.: US 7,045,484 B2
(45) Date of Patent: May 16, 2006

(54) METHOD OF MAKING A CATALYST

(75) Inventors: Michael A. Fetcenko, Rochester Hills, MI (US); Stanford R. Ovshinsky, Troy, MI (US); Kwo Young, Troy, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 0 days.

(21) Appl. No.: 11/032,566

(22) Filed: Jan. 10, 2005

(65) Prior Publication Data

US 2005/0120827 A1  Jun. 9, 2005

Related U.S. Application Data

(60) Division of application No. 09/523,820, filed on Mar. 13, 2000, now Pat. No. 6,841,512, which is a continuation-in-part of application No. 09/290,633, filed on Apr. 12, 1999, now Pat. No. 6,270,719.

(51) Int. Cl.
*B01J 23/00* (2006.01)
*B01J 21/00* (2006.01)
*B01J 27/00* (2006.01)

(52) U.S. Cl. ............ 502/300; 502/177; 502/208; 502/216; 502/224; 502/232; 502/335; 502/337

(58) Field of Classification Search ............... 502/300, 502/335, 337, 177, 208, 216, 224, 232; 420/580, 420/900, 590, 591
See application file for complete search history.

(56) References Cited

U.S. PATENT DOCUMENTS

| | | | | |
|---|---|---|---|---|
| 3,448,060 A | * | 6/1969 | Mason ....................... 502/301 |
| 3,719,732 A | * | 3/1973 | Diffenbach et al. ............. 264/9 |
| 3,809,658 A | * | 5/1974 | Petro et al. .................. 502/301 |
| 3,990,996 A | * | 11/1976 | Gal et al. .................... 502/301 |
| 4,248,679 A | * | 2/1981 | Welch et al. ................ 205/512 |
| 4,323,595 A | * | 4/1982 | Welch et al. ................ 427/456 |
| 4,716,088 A | | 12/1987 | Reichman et al. |
| 5,536,591 A | | 7/1996 | Fetcenko et al. |
| 5,536,694 A | * | 7/1996 | Schuetz et al. ............. 502/301 |
| 6,461,766 B1 | * | 10/2002 | Young et al. ............ 429/218.2 |
| 6,569,567 B1 | | 5/2003 | Reichman et al. |

* cited by examiner

*Primary Examiner*—Cam N. Nguyen
(74) *Attorney, Agent, or Firm*—Philip H. Schlazer; Marvin S. Siskind

(57) ABSTRACT

A method of making a catalyst. The method comprises the step of leaching alloy particles. Preferably, the alloy particles are hydrogen storage alloy particles.

19 Claims, 9 Drawing Sheets

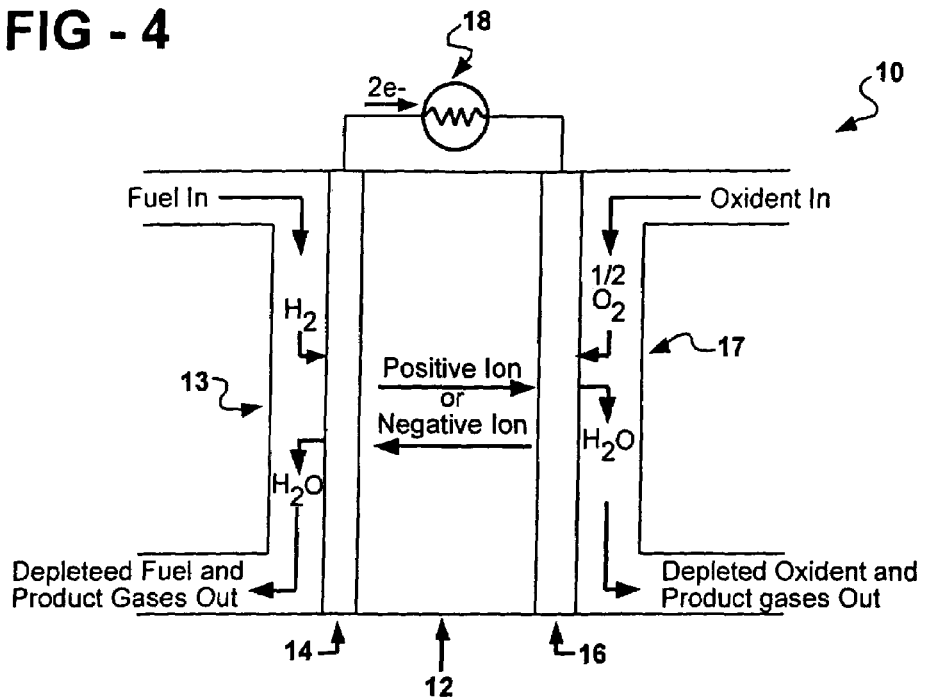
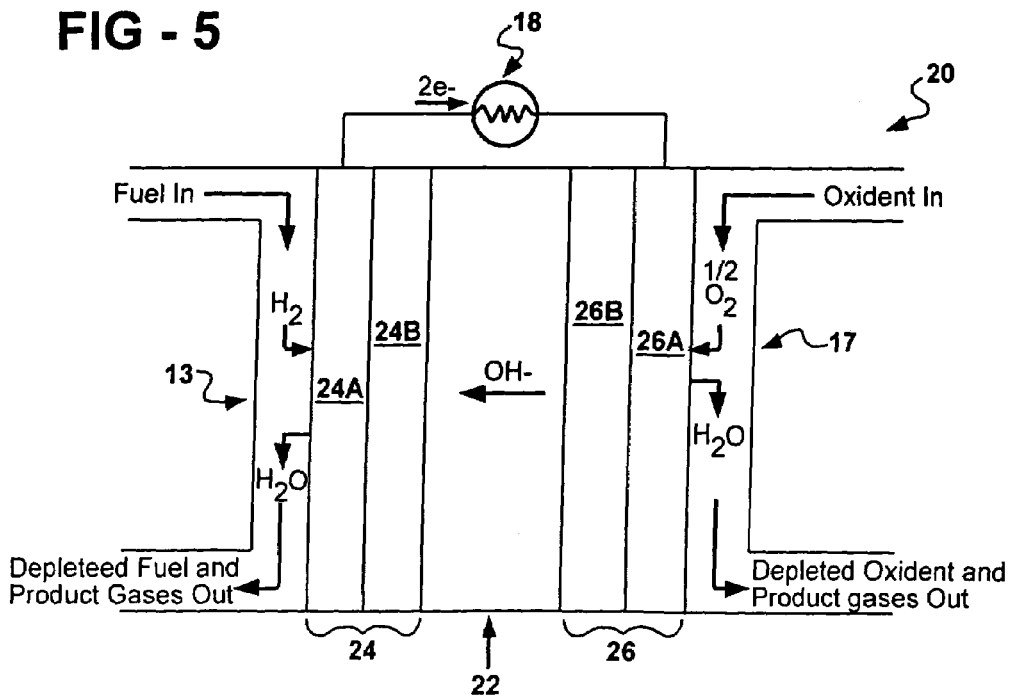

METHOD OF MAKING A CATALYST

RELATED APPLICATION INFORMATION

This application is a divisional application of application Ser. No. 09/523,820 filed on Mar. 13, 2000, U.S. Pat. No. 6,841,512, which is a continuation-in-part of application Ser. No. 09/290,633 filed on Apr. 12, 1999, U.S. Pat. No. 6,270,719. application Ser. No. 09/523,820, U.S. Pat. No. 6,841,512 is hereby incorporated by reference herein.

FIELD OF THE INVENTION

The present invention relates to catalysts and more specifically to methods of making catalysts.

BACKGROUND OF THE INVENTION

A fuel cell is an electrochemical device in which the chemical energy of a conventional fuel is converted directly and efficiently into low voltage electrical energy. Fuel cells have many potential applications such as supplying power for transportation vehicles, replacing steam turbines and remote power supply applications.

Fuel cells, like conventional batteries, operate by utilizing electrochemical reactions. Unlike a battery, in which chemical energy is stored within the cell, fuel cells generally are supplied with reactants from outside the cell. Barring failure of the electrodes, as long as the fuel (preferably hydrogen), and the oxidant (preferably either oxygen or air that contains oxygen) are supplied and the reaction products are removed, the cell continues to operate.

Fuel cells also offer a number of important advantages over engine or generator systems. They include relatively highly efficient, environmentally clean operation especially when utilizing hydrogen as a fuel, high reliability, few moving parts, and quiet operation.

A schematic diagram of a fuel cell with the reactant/product gases and the ion conduction flow directions through the cell is shown in FIG. 4. Referring to FIG. 4, the major components of a typical fuel cell 10 is an anode 14, a cathode 16 and an electrolyte layer 12. In the embodiment shown, the anode 14 and the cathode 16 are each in contact with and positioned on opposite sides of the electrolyte layer. During operation, a continuous flow of fuel, commonly hydrogen, is fed to the anode 14 while, simultaneously, a continuous flow of oxidant, commonly oxygen or air, is fed to the cathode 16. In the example shown, the hydrogen is fed to the anode 14 via a hydrogen compartment 13. Likewise, the oxygen or air is fed to the cathode 16 via an oxygen/air compartment 17. The fuel is oxidized at the anode with a release of electrons through the agency of a catalyst. These electrons are conducted from the anode 14 through wires external to the cell, through the load 18, to the cathode 16 where the oxidant is reduced and the electrons are consumed, again through the agency of a catalyst. The constant flow of electrons from the anode 14 to the cathode 16 constitutes an electrical current that can be made to do useful work. Typically, the reactants such as hydrogen and oxygen, are respectively fed through the porous anode 14 and cathode 16 and brought into surface contact with the electrolyte 12. The particular materials utilized for the anode 14 and cathode 16 are important since they must act as efficient catalysts for the reactions to take place.

Despite their potential advantages, fuel cells have not been widely utilized due in large part to their relatively high cost. An important factor contributing to this high cost is the catalytic inefficiencies of the prior art catalytic materials and/or the high costs of many of these materials. The catalytic inefficiencies of the materials increase the operating costs of the fuel cell since such inefficiencies result in a lower electrical energy output for a given amount of fuel. The use of expensive catalytic materials, such as noble metal catalysts, results in fuel cells which are too expensive for widespread application.

High catalytic efficiency at low cost is a desired result which must be attained before widespread commercial utilization of fuel cells is possible. Prior art fuel cell anode catalysts, which have been generally predicated on either expensive noble metal catalysts with a relatively low density of catalytically active sites, have not been able to meet the requirements. The present invention is directed toward novel, low cost and highly efficient catalytic materials that are useful for a variety of applications such as a fuel cell anode. The present invention is also directed toward an efficient and inexpensive method of making the novel catalytic materials.

SUMMARY OF THE INVENTION

An objective of the present invention is an inexpensive, highly catalytic material that may be used for facilitating hydrogen consumption in a fuel cell anode. Another objective of the present invention is a catalytic material having a finely divided metal particulate with very small particle size. Yet another objective of the present invention is a cost effect method for making the instant catalytic materials. Yet another objective of the present invention is a fuel cell anode and a fuel cell incorporating the instant catalytic materials.

These and other objectives are satisfied by a catalyst lacking platinum and palladium, the catalyst comprising: a metal particulate having a particle size less than about 100 Angstroms; and a support.

These and other objectives are also satisfied by a catalyst, comprising: a nickel and/or nickel alloy particulate having a particle size less than about 100 Angstroms, the nickel alloy lacking platinum and palladium; and a support.

These and other objectives are also satisfied by a catalyst comprising a metal particulate and a support, the catalyst characterized by being formed by the process comprising the step of leaching at least a significant portion of the bulk of a hydrogen storage alloy.

These and other objectives are satisfied by a method for making a catalyst, comprising the steps of: providing a hydrogen storage alloy; and leaching at least a significant portion of the bulk of the alloy.

These and other objectives are satisfied by a fuel cell, comprising: an anode having a catalyst lacking platinum and palladium, the catalyst comprising: a metal particulate having a particle size less then about 100 Angstroms, and a support. The fuel cell preferably further comprise a cathode and an electrolyte. The electrolyte may comprise an alkaline material.

These and other objectives are satisfied by a fuel cell, comprising: an anode having a catalyst comprising: a nickel and/or nickel alloy particulate having a particle size less than about 100 Angstroms, the nickel alloy lacking platinum and palladium, and a support. The fuel cell preferably further comprises a cathode and an electrolyte. The electrolyte may comprise an alkaline material.

BRIEF DESCRIPTION OF THE DRAWINGS

FIG. 4 is a schematic diagram of a fuel cell;

FIG. 5 is a diagram of an alkaline fuel cell using the catalyst of the present invention;

DETAILED DESCRIPTION OF THE INVENTION

Figure 1:
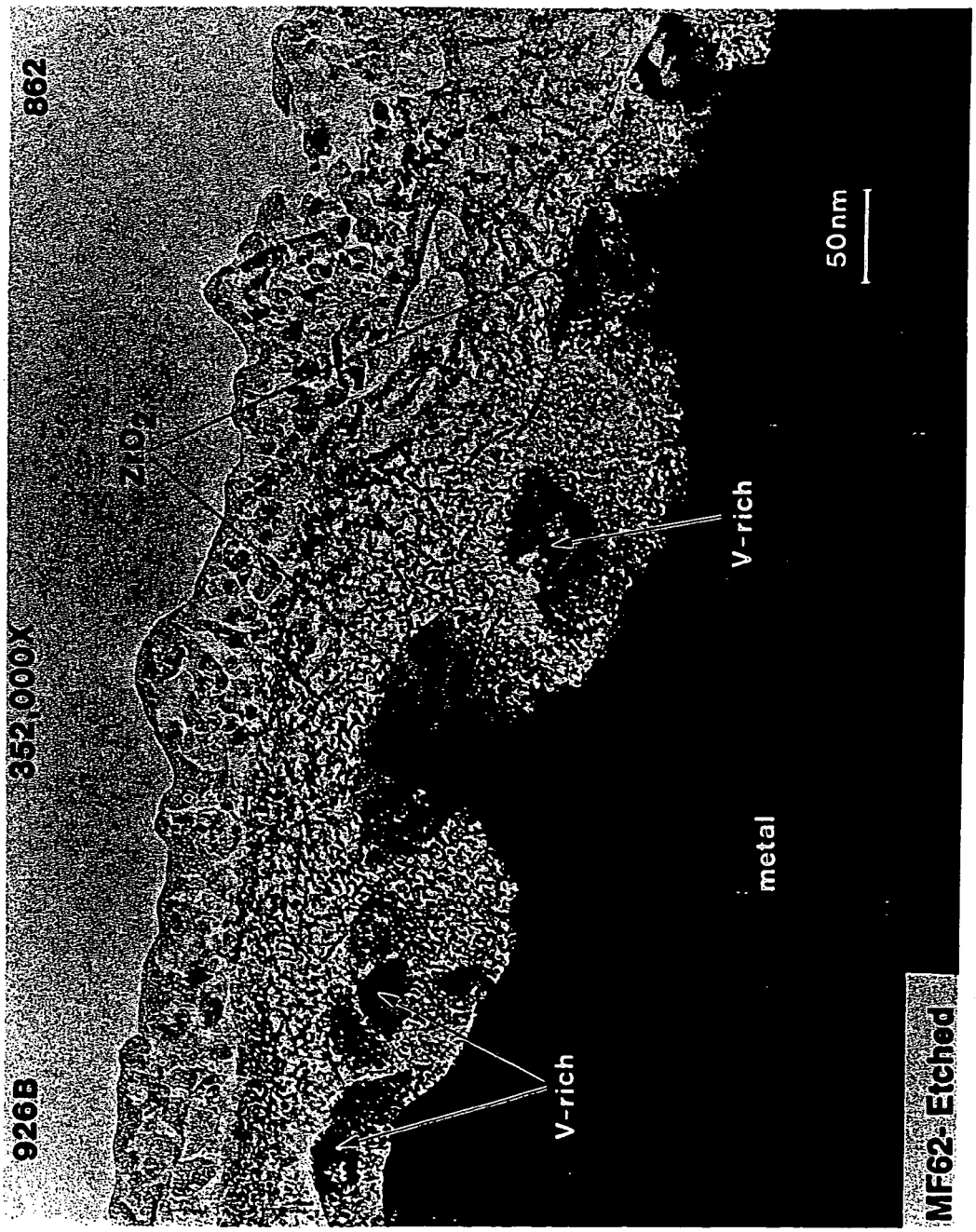
FIG. 1 is an STEM photomicrograph showing the effects of leaching a hydrogen storage alloy particle with an alkaline solution.

Disclosed herein is a novel catalyst particularly useful for facilitating the consumption of molecular hydrogen in a fuel cell anode. The catalyst is designed to have a high density of catalytically active sites to provide efficient, low cost fuel cell operation. With a greater density of catalytically active sites, the hydrogen oxidation reaction occurs much more readily to allow for more efficient hydrogen consumption at reduced costs.

Generally, the catalyst of the present invention comprises a metal particulate, and a support. The particulate may be affixed to the surface of the support. Alternately, the particulate may be partially or totally embedded into the support. The metal particulate is a plurality of metal particles. Preferably, each metal particle may be a substantially pure elemental metal, or it may be an alloy of two or more elemental metals. It is also possible that one or more of the individual particles may be a composite or mixture of two or more elemental metals, two or more alloys, or an elemental metal and an alloy. All of the particles may have the same composition or they may be a mixture of particles with different compositions. Also, some of the particles may be substantially pure elemental metals while others may be alloys of two or more elemental metals.

In one preferred embodiment of the present invention, the catalyst lacks both platinum and palladium. Hence, there are no platinum particles or palladium particles. As well, none of the metal particles comprise either platinum or palladium as part of an alloy, composite or mixture.

In another embodiment of the present invention, the metal particulate comprises nickel particles and/or nickel alloy particles. The nickel alloy includes nickel and at least one additional elemental metal. Preferably, the at least one additional elemental metal may be any elemental metal except for either platinum or palladium. (Hence, it is preferable that the nickel alloy lacks both platinum and palladium). More preferably, the at least one additional elemental metal is selected from the group consisting of Al, Co, Sn, Mn, Ti and Fe. Most preferably, the at least one additional elemental metal is selected from the group consisting of Al, Co, Sn, Mn, and Ti. Examples of nickel alloys which may be used include nickel alloys comprising Ni and Co; nickel alloys comprising Ni, Co and Al; nickel alloys comprising Ni, Co, Mn and Ti; nickel alloys comprising Ni, Co, Mn and Fe; and nickel alloys comprising Ni and Mn. Specific examples of nickel alloys include a NiCo alloy, a NiCoAl alloy, a NiCoMnTi alloy, a NiCoMnFe alloy, and a NiMn alloy.

It is believed that the addition of modifier elements to the nickel to form a nickel alloy increases the surface roughness of the metal particles. Since surface roughness is the total surface area divided by the geometric surface area, the increased roughness provides for an increase in the total surface area of the metal particulate. The increased surface area provides for an increase in the number of active catalysis sites (i.e., there is increased accessibility to the catalytic material). Hence, the catalytic activity of the material is increased.

The increased surface area also makes the catalytic material less easy to poison. This is a crucial factor in the commercial viability of fuel cell anodes. Generally, poisoning is reduced as the number of active catalysis sites increases. As just discussed, this occurs with increased surface roughness and surface area. (It is noted that surface area can also be increased in other ways besides increasing surface roughness. For example, surface area may be increased by making the metal catalytic particles smaller and packing them closer together. This will also decrease the chance of the poisoning).

The addition of modifier elements to the metallic nickel can also inhibit poisoning in other ways. Poisoning can be affected by the actual composition of the metallic particulate. By identifying the poison and the mechanism for poisoning, a suitable modifier may be added to the metal particulate to combat the poisoning. For example, poisoning may be due to the build-up of a passivating oxide on the surface of the metal particulate, thereby impeding the $H_2$ dissociation reaction. In this case, a modifier element such as cobalt or aluminum could be added at a concentration which is effective to provide an ongoing leaching of the particulate by the electrolyte in order to constantly provide a clean, new metallic surface which is free of the passivating oxide.

Also, poisoning may be due to the corrosion of the particulate and/or its support by the electrolyte. In this case a passivating agent, such as Zr or Mn, could be added. Though not wishing to be bound by theory, it is possible that these modified catalysts may be especially resistant to $H_2$ contaminants such as $H_2S$, $CH_4$, $CO_2$, CO, which are aggressive poisons to fuel cell anode catalysts.

It is also believed that adding certain elements, such as Al, Sn and Co, to the nickel to form the nickel alloy may actually inhibit the growth of the alloy particles and cause the average size of the particles to remain small. As discussed above, decreasing the particle size while packing the particles closer together increases the total surface area of the particulate, increasing catalytic activity and decreasing the possibility of poisoning.

The catalytic metal particles of the present invention are not limited to any particular shape. They may be regularly shaped or irregularly shaped. Examples of particle shapes include spherical, elongated, thread-like, and "sponge-like". "Sponge-like", porous particles may be made by initially including in the metal particulate a modifier element, such as aluminum, whose sole purpose is to be leached out so as to leave the catalyst particulate with a sponge-like shape and a high surface area. The leaching step may be carried out by subjecting the alloy to an aqueous solution of an alkali metal hydroxide such as potassium hydroxide, lithium hydroxide, sodium hydroxide, or mixtures thereof. Preferably, the leaching may be done in a highly concentrated KOH solution (perhaps about 45 wt % to about 60 wt %), at elevated temperature of about 80° C. to about 120° C., for a time of about one hour to about four hours. Of course, other leaching conditions are also possible. After the leaching step, the remaining insoluble component forms a particulate with a sponge-like, porous structure. The increased porosity increases the surface area of the particulate.

It is noted that the catalytic activity of a material may be determined by measuring the materials exchange current $I_o$ (measured in mA/g). The exchange current $I_o$ is a function of both the material's exchange current density $i_o$ (measured in mA/m$^2$) as well as the material's surface area A (m$^2$/g). Specifically, the exchange current, the exchange current density and the surface area are all related as follows:

$$I_o = i_o \times A \quad (1)$$

Equation (1) shows that the total catalytic activity of a material (as measured by the total exchange current $I_o$) is a function of both the catalytic activity of the material composition (as measured by the exchange current density $i_o$) as well as the surface area of the material A. Hence, the total catalytic activity of a material may be increased by either appropriately changing its composition to one which is more catalytic or by increasing its effective surface area. As discussed above, the effective surface area may be increased by increasing the porosity and/or roughness of the catalytic particles. It also may be increased by using a larger number of smaller-sized particles, and by packing these smaller-sized particles closer together. The effective surface area may also be increased by increasing the porosity and surface area of the support upon which active material is dispersed. The support will be discussed in more detail below.

Preferably, the catalytic metal particles of the present invention have a very small particle size. Specifically, the particles have an average particle size which is preferably less than about 100 Angstroms, more preferably less than about 70 Angstroms, and most preferably less than about 50 Angstroms. In addition, the particles may have an average particle size which is preferably be less than about 40 Angstroms and more preferably may have an average particle size which is less than about 30 Angstroms. In addition, the particulate may have a particle size between about 10 to about 70 Angstroms, preferably between about 10 to about 50 Angstroms, more preferably between about 10 to about 40 Angstroms and most preferably between about 10 and about 30 Angstroms.

A key aspect of the instant invention is the disclosure of a practical embodiment and method of producing "ultra fine catalysts". Since the catalytic properties of a material are primarily a surface property (rather than a bulk property), large catalytic metal particles essentially waste the interior metallic atoms. For expensive elements, such as platinum and palladium (well known to have the required stability for fuel cell anode use), this waste of material provides an unacceptable cost. Therefore, the smaller the metallic particles, the better since the surface area for catalysis rises proportionally. It is extremely difficult to produce Angstrom size metallic particles. Hence, the disclosure of 10–50 Angstrom size particles (which themselves may have additional surface area due to surface roughness) in a finely divided distribution within an inexpensive support is unique.

In certain embodiments of the present invention, the metal particles of the present invention are situated in close proximity to one another so that the particulate has a high density. (Hence, there is also a high density of catalytic activity). The particulate may have an average proximity that is preferably between about 2 and about 300 Angstroms, and more preferably between about 50 to about 100 Angstroms.

In other embodiments of the invention the percentage weight of the metal may be varied so that the metal particulate is preferably between about 0.0001% to about 99% by weight of the catalyst, more preferably between about 0.001% to about 99% by weight of the catalyst, most preferably between about 0.01% to about 99% by weight of the catalyst.

Figure 2:
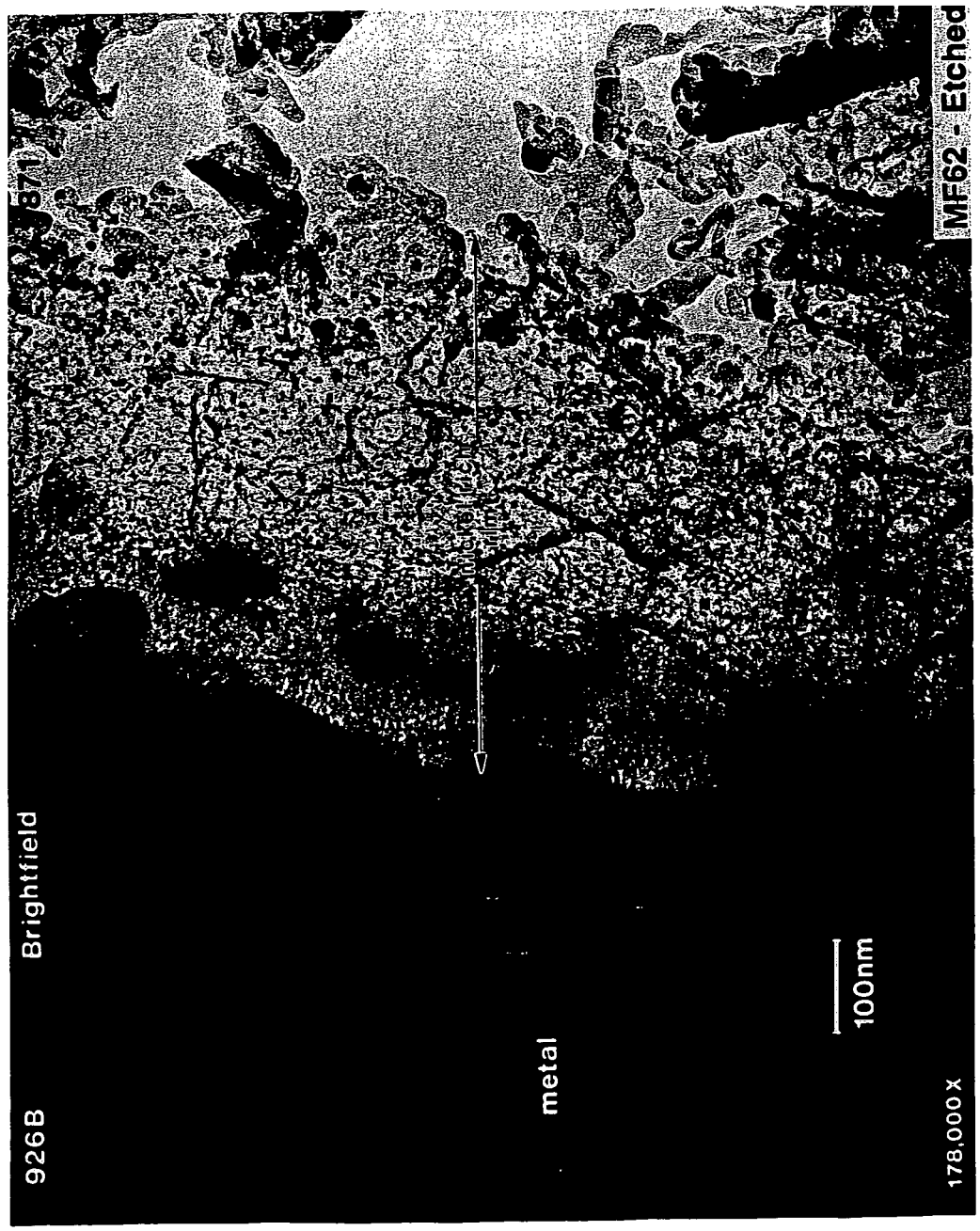
FIG. 2 is an STEM photomicrograph of the instant catalytic material, performed under Brightfield imaging, showing the catalytically active nickel rich regions.
Figure 3:
FIG. 3 is an STEM photomicrograph, performed under Darkfield imaging, of the same region of catalytic material from FIG. 2.

Experimental observations from high resolution scanning transmission electron microscopy (STEM) of specific embodiments of the instant catalytic material show the presence of catalytic regions or "catalytic clouds". These catalytic regions may comprise nickel and/or nickel alloy regions. The nickel or nickel alloy regions may be regions of metallic nickel particles and/or nickel alloy particles having an average size of about 10 to about 30 Angstroms in diameter. In some of these regions, the proximity between the particles may be between about 10 to about 50 Angstroms. In other regions, the metallic nickel and/or nickel alloy particles are even more closely packed, having a proximity on the order of about 10 to about 20 Angstroms. Specifically, FIG. 2 is an STEM photomicrograph of the instant catalytic material, performed under Brightfield imaging, showing the catalytically active nickel rich regions. FIG. 3 is an STEM photomicrograph, performed under Darkfield imaging, of the same region of catalytic material from FIG. 2. FIG. 3 shows the metallic nickel particles.

Preferably, the metal particulate of the present invention is "stable" over time. That is, preferably, the size of the particles remains small and does not increase over time. This helps to ensure that the total surface area of the particulate remains stable (i.e., does not decrease) over time.

The catalyst of the present invention further comprises a support for the metal particulate. Generally, any support conventionally known in the art, capable of supporting and providing adequate dispersion for the particulate, may be used. Preferably, the support should be inexpensive and stable in the local environment in which it is being used. The support used preferably has a surface area and/or porosity sufficient to provide an adequate dispersion of the metal particles, thereby allowing both penetration of electrolyte for the anode reaction, but preferably not allowing the electrolyte to penetrate to the $H_2$ gas compartment.

Increasing the porosity of the support also provides for a more intimate contact between the hydrogen gas reactant and the catalytic material. In the case of a liquid electrolyte, it also enhances the contact between the electrolyte and the catalytic particles thereby improving or optimizing proton transfer. Generally, the metal particulate may be affixed to the surface of a support and/or partially embedded in the support and/or totally imbedded in the support.

The instant invention also facilitates introduction of an electrolyte impermeable membrane in combination with a current collection substrate such as wire mesh or expanded metal.

In one embodiment of the present invention, the support comprises one or more inorganic oxides. The inorganic oxides may be metal oxides. The oxides may comprise at least one element selected from the group consisting of nickel, cobalt, manganese, titanium, zirconium, iron and the rare earth elements. The oxides may comprise one or more individual oxides of the elements nickel, cobalt, manganese, titanium, zirconium, iron and the rare earth elements. Alternately, the oxides may comprise one or more oxides of alloys formed from two or more of the elements nickel, cobalt, manganese, titanium, zirconium, iron and the rare earth elements.

In a first example, the support comprises an oxide of manganese. In a second example, the support comprises an oxide of nickel and manganese. In a third example, the support comprises an oxide of nickel, manganese, cobalt, and titanium. In a fourth example, the support comprises an oxide of nickel, manganese, cobalt, titanium and iron. In a fifth example, the support comprises an oxide of nickel, manganese, cobalt and titanium. In a sixth example, the support comprises an oxide of titanium and zirconium. In a seventh example the support comprises silica. In an eighth example, the support comprises alumina. The metal particulate may be affixed to the surface of the oxide support. Alternately, the metal particulate may be at least partially embedded within the oxide support, or it may be totally embedded within the oxide support.

In still another preferred embodiment of the instant invention, these ultra-fine catalysts may be combined with zeolite materials. The zeolites may have variable metal to silicon ratios, and the ratio of the catalyst to zeolite may also vary. A combination of catalyst/support oxide/zeolite is a preferred embodiment.

The oxide support may itself be catalytic. In fact, by using certain oxides as the support material, regions of exceptionally high catalytic activity may be formed, especially at the double or triple or more junctions between the metallic particle and the support oxide where designed regions of hydrophobic or hydrophilic property may be formed. Analytical studies show that these regions are rich in such elements as nickel, cobalt, manganese and titanium, and are referred to herein as "NiCoMnTi super catalytic regions". It is believed that these super catalytic regions may consist of nickel-manganese alloy particles embedded in a titanium-zirconium oxide. These super catalytic regions show a surprising lack of oxygen (based on the results of Electron Energy Loss Spectroscopy-EELS). It is also believed that the oxide portion of these regions may be partially metallic and/or exist in a low oxidation state.

The oxide support also may be formed from metal oxides which are "microcrystalline" in structure, having crystallites of very small size. Because of their small crystallite size, these oxides have an increased number of grain boundaries which provide "ionic pathways" for both hydrogen and hydroxyl ions. (These ionic pathways may permit the hydrogen and hydroxyl ions to more more freely to the metallic nickel or nickel alloy catalytic sites which may be situated in the grain boundaries). Hence, such oxides facilitate ionic transport through the catalytic material.

Alternately, the oxide support may be formed so that it at least partially comprises a "multivalent" oxide material such as manganese oxide, $MnO_x$. Because manganese oxide is multivalent, it is believed that it may further promote increased catalytic activity by changing oxidation states.

It is also possible to add a polymeric material to the oxide support in order to modify the hydrophobic/hydrophilic nature of the catalyst bed. Examples of such polymers include fluropolymers such as polytetrafluoroethylene (PTFE).

The oxide support may comprise fine-grained oxides, coarse-grained oxides or a mixture of fine-grained oxides and coarse-grained oxides. Alternately, the oxide support may be formed so that it comprises a "multi-phase" oxide material. For example, the oxide may be formed so that it includes both fine-grained and coarse-grained regions. The fine-grained region may include oxides such as a manganese oxide $MnO_x$, a NiMnCoTi oxide or a MnCoTi oxide. One advantage of a multiphase oxide may be the suitable structural integrity of the fuel cell anode to withstand the rigors of transportation where vibration can cause premature fuel cell failure. The coarse-grained regions may include oxides such as a TiZr oxide.

The catalytic materials of the present invention may be formed so that the metal particles have certain crystal structures (based on Select Area Electron Diffraction—SAED) within the oxide support. For example, catalytic materials comprising nickel alloy particles embedded within an oxide material may be formed so that the alloy particles have a face-center-cubic (fcc) structure. The formation of an fcc crystal structure may be influenced by the high degree of substitution of the modifier elements (such as Co, Al, Mn, Sn) for the nickel. The fcc nickel alloy in conjunction with the NiCoMnTi super catalytic regions and the TiZr oxide forms a structure which may further promote ionic diffusion and reaction. In an alternate embodiment of the present invention, the support may be formed from a carbon material. Examples of carbon supports include carbon black, graphite, activated carbon, charcoal and carbine. Mixtures of carbon materials and inorganic oxides may also be used. Alternately, the support may comprise a carbide. For example, the support may comprise a binary compound of carbon and another element. (Examples of carbides include those of calcium, tungsten, silicon, boron, and iron). Additionally, other mixtures or blends of supports can be used to provide high surface area for the catalytic metal particulate and good electronic conductivity as well as good ionic transport.

Alternately, the support may comprise a halide such as a chloride. Alternately, the support may comprise a phosphide, a silicide, or a nitride. Of course, the support may be a blend or mixture of the materials described above.

One of the starting materials for the formation of the catalytic materials of the present invention are hydrogen storage alloys. These are materials which are capable of the absorption and release of hydrogen. Hydrogen storage alloys are known in the art. Examples of very simple hydrogen storage alloys are the TiNi and $LaNi_5$ alloys. Other examples of hydrogen storage alloys are provided in U.S. Pat. No. 4,623,597 (the disclosure of which is incorporated by reference). The materials described in the '597 patent have a greatly increased density of catalytically active sites providing for the fast and stable storage and release of hydrogen. These materials were fabricated by manipulating the local chemical and structural order by incorporating selected modifier elements into a host matrix so as to create the desired disorder. Additional hydrogen storage alloys are disclosed in U.S. Pat. No. 4,551,400 ("the '400 patent"), the disclosure of which is incorporated by reference. These materials utilize a generic Ti—V—Ni composition where at least Ti, V, and Ni are present with at least one or more of Cr, Zr, and Al. Other Ti—V—Zr—Ni alloys are described in U.S. Pat. No. 4,728,586 ("the '586 patent"), the disclosure of which is incorporated by reference. The '586 patent described a specific sub-class of these Ti—V—Ni—Zr alloys comprising Ti, V, Zr, Ni, and a fifth component Cr. Modified $LaNi_5$ materials are discussed in U.S. Pat. No. 5,096,667, ("the '667 patent") the contents of which is incorporated by reference herein. Still other examples of hydrogen storage alloys are described in U.S. Pat. Nos. 5,840,440, 5,536,591 ("the '591 patent") and in commonly assigned U.S. Patent application Ser. No. 09/290,633 ("the '633 application"). The contents of U.S. Pat. Nos. 5,840, 440, and 5,536,591 as well as the contents of U.S. patent application Ser. No. 09/290,633 are all incorporated by reference herein.

Examples of alloys described in the '591 patent are alloys having the composition:

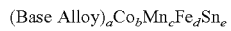
(Base Alloy)$_a$Co$_b$Mn$_c$Fe$_d$Sn$_e$ where Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 7 atomic percent; d is 0 to 3.5 atomic percent; e is 0 to 1.5 atomic percent; and a+b+c+d+e=100 atomic percent. Many of the alloys described in the '591 patent include Mn, the effects of which is discussed in the '667 patent, the disclosure of which is incorporated by reference herein.

The '633 application describes certain hydrogen absorbing alloys formed by adding one or more modifier elements to certain "base" alloys. The base alloys preferably have a composition consisting essentially of 0.1 to 60% Ti, 0.1 to 40% Zr, 0 to 60% V, 0.1 to 57% Ni, 5 to 22% Mn and 0 to 56% Cr. The modified alloys which are described in the '633 application are referred to herein as "the '633 alloys".

Preferably, the modifying elements are chosen from the group consisting of Al, Co, Sn, and Fe. More preferably, the modifying elements are chosen from the group consisting of Al, Co, and Sn. In a first example, all three modifying elements, Al, Co, and Sn are added to the base alloy. In a second example, all four modifying elements, Al, Co, Sn and Fe are added to the base alloy. In a third example, the modifier elements may added to the base alloy so that the atomic percentage of Al is between about 0.1 and about 10, the atomic percentage of the Co is between about 0.1 and about 10, the atomic percentage of the Sn is between about 0.1 and about 3.0, and the atomic percentage of the Fe is between about 0.0 and about 3.5. In a fourth example, the modifier elements may be added to the base alloy so that the resulting modified alloy has the following composition: Ti$_{9.0}$Zr$_{26.2}$V$_{5.0}$Vi$_{38.0}$Cr$_{3.5}$Co$_{1.5}$Mn$_{15.6}$Al$_{0.4}$Sn$_{0.8}$.

Hydrogen storage alloys tend to react with oxygen to form metal oxides by the reaction:

$$M+x/2O_2 \rightarrow MO_x \qquad (2)$$

Hydrogen storage alloys are sensitive to the formation of surface oxides so that most, if not all, of these alloys comprise an initial surface oxide layer. The composition of this initial surface oxide layer depends, at least in part, on the composition of the underlying bulk alloy material (that is, upon the constituent metals which make up the bulk material as well as the atomic percentage of those metals). The oxide surface layer is typically between about 50 Angstroms to about 1000 Angstroms thick, although thicknesses of the surface oxide layer of up to about 5000 Angstroms are possible.

The initial surface oxide of a hydrogen storage alloy may be modified by an etch process. Alkaline etch processes are described in U.S. Pat. No. 4,716,088 ("the '088 patent") as well as in commonly assigned U.S. patent application Ser. No. 09/395,391 ("the '391 application"). Both the '088 patent as well as the '391 application are incorporated by reference herein. As described in the '088 patent, the major role of the etch process is that of surface modification. The '088 patent, '391 application as well as the '591 patent and the '633 application describe the effects of the etch process on the surface oxide.

A method of making the catalytic material of the present invention is by subjecting a hydrogen storage alloy starting material (which is preferably in the form of a powder) to a leaching process (also referred to herein as a "leaching treatment"). The leaching process of the present invention is a deep, penetrating "bulk" leaching process. This means that the leaching material (the active material that does the leaching—also referred to as "leaching agent" or "leachant") penetrates well below the 5000 Angstrom initial surface oxide layer of the alloy particle and into the particle bulk. As used herein, "bulk" refers to the interior region of the particle beneath the 5000 Angstrom oxide surface layer. The leaching process penetrates and treats (i.e., leaches) at least a significant portion of the bulk of the alloy particle. Preferably, a significant portion of the bulk is leached when the leaching process treats at least about 10,000 Angstroms of the hydrogen storage alloy particle. Hence, it is preferable that at least about a 10,000 Angstrom thick layer of the hydrogen storage alloy particle is leached. More preferably, at least about 20,000 Angstroms of the particle is leached. Most preferably, at least about 30,000 Angstroms of the particle is leached. In another embodiment of the method, it is preferable to leach at least about 40,000 Angstroms of the particle. It is more preferable to leach at least about 50,000 Angstroms of the particle. In a preferred embodiment of the method, it is preferable to leach substantially the entire bulk of the hydrogen storage alloy material. Hence, in a preferred embodiment, substantially the entire hydrogen storage alloy particle is leached.

In other embodiments of the instant invention preferably at least about 10% of the hydrogen storage alloy particle is leached, more preferably at least about 25% of the hydrogen storage alloy particle is leached, and most preferably at least about 50% of the hydrogen storage alloy particle is leached. In yet other embodiment of the instant invention preferably at least about 75% of the hydrogen storage alloy particle is leached, and more preferably at least about 90% of the hydrogen storage alloy particle is leached.

As described above, an embodiment of the instant catalytic materials is a finely divided metal particulate embedded in an oxide support. In particular, the metal particulate may be a metallic nickel and/or a nickel alloy where the nickel alloy lacks both platinum and palladium. This embodiment may be made by subjecting the hydrogen storage alloy material to the appropriate leaching process. The leaching process penetrates into substantially the entire particle bulk and converts the oxidizable components of substantially the entire bulk of the alloy particle to oxides. Hence, the oxidizable components of substantially the entire alloy particle in converted to oxides.

The hydrogen storage alloy may be subjected to a leaching process by "contacting" the alloy material with an appropriate leaching material for a predetermined period of time, at a specific temperature and at a specific pH. To convert the alloy material to oxide, the appropriate leaching material may be an alkaline solution. The hydrogen storage alloy may be "contacted" with the alkaline solution by placing the alloy (which is preferably in powder form) in a container of the alkaline solution. The alkaline solution is preferably formed as an aqueous solution of an alkali metal hydroxide. Examples of alkali metal hydroxides which may be used include potassium hydroxide, sodium hydroxide, lithium hydroxide, and mixtures thereof. The pH of the alkaline solution may be adjusted by changing its alkaline concentration. The alkaline concentration is adjusted by changing the percentage weight of the alkali metal hydroxide added to the aqueous solution. The period of time in which the leaching material (i.e, in this case, the alkaline solution) is in contact with the hydrogen storage alloy, as well as the temperature and pH of the leaching agent are all result-effective variables which can be varied to effect the outcome of the leaching process.

Many of the metallic components within the bulk of the alloy are readily oxidized by the concentrated alkaline solution of the leaching process. However, some of the metallic elements and/or alloys within the bulk of the alloy are resistant to oxidation by the alkaline solution. By choosing an appropriate starting alloy and then subjecting this starting alloy to the alkaline solution for a certain period of time and at a certain temperature and pH, it is possible to convert the oxidizable components to oxides. However, some of the metallic components and/or alloy components are resistance to oxidation by the alkaline solution and are not converted oxides. In fact, by carefully selecting the appropriate starting hydrogen storage alloy as well as the appropriate leaching conditions, the starting alloy may be leached so that substantially all of the oxidizable components of the hydrogen storage alloy material are converted to oxides. Those components which are resistant to oxidation will remain as metallic elements or alloys.

Hence, in a preferred embodiment of the catalytic material of the present invention may be formed by selecting an appropriate starting hydrogen storage alloy material and then leaching the material with the appropriate leaching material and under the appropriate conditions (i.e., time, temperature and pH) until substantially all of the oxidizable components of the starting hydrogen storage alloy are converted to oxides (i.e., so that substantially none of the oxidizable components of the hydrogen storage alloy remain). This "completely oxidized" material includes a finely divided, highly catalytic metal and/or alloy particulate (which is preferably nickel and/or nickel alloy) that, as discussed above, is resistant to conversion to oxide by the alkaline solution. The oxidized material with metal particulate may be referred to herein as a "catalytic oxide". The metal particulate may be extremely small. As discussed the particles may be made which have an average particle size which is preferably less than about 100 Angstroms, more preferably less than about 70 Angstroms, and most preferably less than about 50 Angstroms. In addition, in certain embodiments of the present invention the particulate may have a particle size between about 10 to about 70 Angstroms, preferably between about 10 to about 50 Angstroms, more preferably between about 10 to about 40 Angstroms, most preferably between about 10 to about 30 Angstroms.

Hence, the leaching process provides a cost effective way to make a catalytic material comprising metallic nickel and/or nickel alloy particles having an extremely small particle size (i.e., ultra-fine metallic catalysts). It is noted that if one wished to make the same size nickel or nickel alloy particles using metallurgical means it would either not be possible, or if possible, would be cost prohibitive. In particular, it is noted that background art U.S. Pat. No. 4,541,905 to Kuwana, et al. ("the '905 patent") describes a catalytic material formed by the electrodeposition of nickel into a polymeric layer. In contrast to the instant catalytic materials, the catalytic material of the '905 patent comprises nickel oxide rather than elemental metallic nickel. Likewise background art U.S. Pat. No. 5,053,379 to Giordano, et al. ("the '379 patent") also describes a nickel catalyst made by subjecting a nickel compound carrier to a thermal decomposition treatment. In contrast to the present invention, the Ni/MgO catalyst of the '379 patent also consists of nickel oxide rather than metallic nickel.

In addition to converting essentially all of the oxidizable components of the hydrogen storage alloy material to oxides, the leaching treatment may also alter the composition of the oxides. The alkaline solution may do this by dissolving the more soluble oxide components out of the oxide portion. Certain oxides are more soluble than others in an alkaline environment. For example, the oxides of manganese, vanadium, aluminum, cobalt and tin are readily soluble in an alkaline solution while others, such as those of titanium, zirconium and nickel are less soluble. Those oxides which are more soluble will be removed from the oxide layer to the alkaline solution. The less soluble oxides will either remain at part of the oxide or enter the alkaline solution as colloidal particles. Hence, the composition of the oxide portion will be altered. FIG. 1 is an STEM photomicrograph showing the effects of leaching a hydrogen storage alloy particle with an alkaline leaching material (i.e. an alkaline solution). In FIG. 1, only a portion of the hydrogen storage alloy particle has been leached.

Selectively removing the more soluble components of the oxide portion of the catalytic material provides for a greater concentration catalytic sites of metallic nickel and/or nickel alloy, which are resistant to oxidation and also insoluble in the alkaline solution. Nickel and nickel alloys, in their metallic state, are catalytic and electrically conductive, and these catalytic properties are imparted to the oxide region. The oxide region is thus more catalytic and conductive than if it contained a higher concentration of insulating oxides.

Removing the more soluble oxide components also makes the oxide region more porous. An increase in porosity increases the permeability of the oxide region to the diffusion and transport of molecular hydrogen as well as to the diffusion and transport of certain ions, such as hydrogen and hydroxyl ions. An increase in porosity also increases the surface area of the oxide region.

It is noted that the bulk leaching process used to create the catalytic materials of the present invention is distinguishable from alkaline "etching" treatments used to simply modify the initial surface oxide layer (described above) of the hydrogen storage alloy. As discussed above, this initial surface layer is about 1000 Angstroms thick. Alkaline etch treatments described in the '088 patent as well as the '391 application, are surface treatments used to modify the existing surface oxide of a hydrogen storage alloy material in order to make the material suitable for use as the active electrode material in a metal hydride electrochemical cell (for example, a nickel metal hydride cell). When used as the active material for an electrochemical cell, the hydrogen storage alloy particles themselves may be on the order of about 10 to about 70 microns in size. After the etch treatment, each hydrogen storage alloy particle is surrounded by a relatively thin metal oxide surface layer that may have a thickness of about 1000 Angstroms. Within this oxide surface layer, there are a large number of the metallic nickel and/or nickel alloy particles that are on the order of about 10 to about 70 Angstroms in size. Overall, however, the fraction of the catalytic metal particles in the thin oxide surface layer is small in comparison to the volume of metal present in the non-oxidized bulk of the hydrogen storage alloy particles.

In contrast, as discussed above, the leaching process used to form the catalytic material of the present invention preferably oxidizes substantially all of the starting hydrogen storage alloy particle. Leaching conditions (i.e., leaching time as well as temperature and pH of the leaching material) are selected which completely treat the starting hydrogen absorbing alloy particles so that only oxides with suspended catalytic particles remain (i.e, a "catalytic oxide"). The leaching conditions used to make the catalytic materials of the present invention may be different from those used to activate the hydrogen storage alloy materials for battery applications (i.e., since at least a significant portion of the bulk will be leached, one or more of the leaching conditions may be more aggressive). Also, the selection of the starting hydrogen storage alloy itself may also be different for the instant invention than the starting material used to form an active electrode material for battery applications. For example, the chosen hydrogen storage alloy for the instant invention may use a higher fraction of readily dissolved elements such as V, Co, Al, and Sn.

Specifically, to form the catalytic materials of the present invention, the leaching material may be an alkaline material and the leaching conditions may be chosen so that the temperature of the alkaline material is preferably above about 60° C., and more preferably above about 100° C. The percentage weight of the alkali metal hydroxide is preferably at least about 30 weight %, more preferably at least about 40 weight %, and most preferably at least about 60 weight %. Of course, the leaching conditions are not limited to the above ranges and may be varied to achieve the desired results.

In another embodiment of the method of making the catalytic materials of the present invention, the leaching material used may be an acidic solution. The use of an acidic solution is also within the spirit and scope of this invention. The acidic solution may be an aqueous solution of one or more acids. Examples of acids which may be used include HF, HCl, $H_2SO_4$, and $HNO_3$. Blends of two or more acids may also be used. An example of a blend which may be used is an aqua regia. An example of an aqua regia is a mixture of nitric acid and hydrochloric acid. The leaching process may be implemented by "contacting" the alloy material with an acid (such as HF) for a predetermined period of time, at a specific temperature and at a specific pH.

It is also possible that the desired catalytic materials be made by using two or more leaching processes. For example, a first alkaline leaching treatment may be performed at a first set of leaching conditions (i.e., a first alkaline material as well as a first time, temperature and alkaline concentration), and then a second alkaline leaching treatment may be performed at a second set of etch conditions (i.e., a second alkaline material as well as a second time, temperature and alkaline concentration). This process may be repeated with further, subsequently applied, alkaline leaching treatment. Alternately, one or more of the alkaline leaching treatment may be replaced with one or more acidic leaching processes (wherein the leaching material is an acidic solution). Hence, the leaching process may comprise two or more acidic etch treatments. Alternately, the leaching process may comprise one or more alkaline leaching treatment and one or more acidic leaching treatments. In a particular embodiment, the leaching process may comprise alternating alkaline leaching treatments and acidic leaching treatments. This alternating acid/base treatment is an especially aggressive method to more fully react the starting alloy.

As discussed above, the catalyst of the present invention may be used as the catalytic material of a fuel cell anode. Though not wishing to be bound by theory, it is possible that this fuel cell anode function of the instant catalysts may be assisted by deliberately leaving a portion of the starting hydrogen storage alloy it its metallic (unoxidized) state. Specifically, the dissociation of the $H_2$ gas reactant and subsequent reaction with hydroxyl ions from the electrolyte to form water with the release of an electron according to the reaction equation:

$$H_2(g) + 2OH^- \rightarrow 2H_2O + 2e^- \qquad (3)$$

may be assisted by the following sub-mechanism:

$$H_2(g) + 2M \rightarrow 2MH \qquad (3a)$$

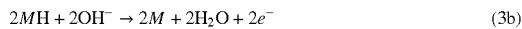

$$2MH + 2OH^- \rightarrow 2M + 2H_2O + 2e^- \qquad (3b)$$

where the molecular hydrogen $H_2$ is first absorbed by the hydrogen storage alloy (step 3a) and then reacted with the hydroxyl ions $OH^-$ from the electrolyte (step 3b). Optimized ratios of unoxidized metal alloy material to catalytic oxide can be determined by optimization experiments. It is possible to produce a catalytic material having such optimized ratios by the appropriate choice of the starting hydrogen storage alloy as well as the appropriate choice of conditions in the bulk leaching process used to treat the alloy.

Hence, by appropriately selecting the appropriate leaching conditions and/or the appropriate starting material, the leaching process may also be used to chemically convert a desired percentage of each of the hydrogen storage alloy particles to the catalytic oxide. Specifically, in another embodiment of the invention, it is preferable that the leaching process chemically converts at least about 10% of each of the alloy particles to the catalytic oxide. It is more preferable that the leaching process chemically converts at least about 25% of each of the alloy particles to the catalytic oxide. It is most preferable that the leaching process chemically converts at least about 50% of each of the alloy particles to the catalytic oxide. In another embodiment, the leaching conditions and/or the starting materials may be chosen so that the leaching process chemically converts at least about 75% of each of the alloy particles to the catalytic oxide. Preferably, the leaching process converts at least about 90% of each of the alloy particles to the catalytic oxide.

It is also possible that the fuel cell function of the instant catalyst be promoted by forming a catalyst which is "compositionally graded". As used herein, compositional grading refers to forming the catalyst so that there is a continuous change (linear or non-linear) in some aspect of the composition in a chosen direction. (Preferably, there is a continuous increase or decrease in some aspect of the composition). For example, referring to FIG. 4, the catalyst incorporated into the anode 14 may be compositionally graded so that there is an increase or decrease in the density of the catalytic sites from the hydrogen input side (i.e., adjacent the hydrogen compartment 13) to the electrolyte side (i.e., adjacent the electrolyte 12). In one embodiment, the catalyst is compositionally graded so that there is a continuous decrease in the density of the catalytic sites from the hydrogen input side (i.e., adjacent the hydrogen compartment 13) to the electrolyte side (i.e., adjacent the electrolyte 12) of the anode 14.

As discussed above, it is also possible to form a support which comprises materials other than oxides. For example, the support may also comprise chlorides, phosphides, silicides, and carbides. These materials may also be made using a deep, penetrating leaching process. The leaching material is appropriately chosen to convert the starting hydrogen storage alloy material to the desired support material. (Of course mixtures of materials may also be formed—with or without oxides). For example, a catalytic phosphide may be formed comprising a finely divided metal particulate embedded in a phosphide.

In an alternate embodiment of the invention, by selecting the appropriate starting material as well as an appropriate leaching process it is also possible extract (i.e., dissolve out) substantially all of the soluble oxide components of the starting material, leaving behind only the small, catalytically active particles. These catalytically active particles may be affixed to a support material or a support structure. For example, they may be mixed with a carbon support material. Alternately, they may be affixed to a support structure such as a conductive grid. Also, they be even be mixed together with a binder, such as PTFE, for mechanical stability.

In the embodiments of the leaching processes described above, the leaching process involved a chemical treatment of the hydrogen storage alloy powder. This may be referred to as "chemical leaching". In an alternate embodiment of the leaching process, the leaching treatment may be electrochemically assisted. That is, a potential may be applied to the hydrogen storage alloy powder so as to make it easier to convert the oxidizable components of the alloy to their respective oxides or to remove the more soluble oxides from the material after the oxides are formed. This type of electrochemically assisted leaching is referred to herein as "electrochemical leaching". The electrochemical leaching is similar in concept to electrochemically assisted etching (applying potential to assist the etching process) which is described in detail in the '088 patent.

From the discussion above, it is seen that by first formulating a hydrogen absorbing alloy material with an appropriate composition and then subjecting this alloy to a leaching process having the appropriate leaching conditions conditions (i.e., time of leaching as well as temperature and pH of the leaching material), substantially the entire starting alloy may be oxidized to form a highly catalytic material comprising a nickel and/or nickel alloy particulate embedded in an oxide support. Generally, by carefully choosing the starting alloy as well as the leaching conditions, this catalytic material may be designed to have the desired catalytic, electrochemical, and physical properties. As seen from the above discussion many different properties may be modified. These properties include, but are not limited to 1) the size, density, roughness and composition of the catalytically active sites, 2) the composition of the oxide support material, 3) crystal structure of the catalytic sites, 4) composition of the oxide support, 5) the grain size of the oxide support, 6) the surface area and porosity of the oxide, 7) the permeability of the oxide to hydrogen gas and to ionic transport (including, but not limited to, hydrogen and hydroxyl ion transport), and 8) the percentage of the hydrogen storage alloy particle converted to oxides.

Furthermore, it is seen from the above discussion, that the catalytic material of the present invention may be formed to make it particularly well suited for use as the catalytically active material for hydrogen consumption in a fuel cell anode. Specifically, the catalytic material may be formed so that it is 1) highly catalytic for the consumption of molecular hydrogen, 2) electrically conductive for the transport of electrons, 3) permeable to the diffusion and transport of hydrogen gas, 4) permeable to the diffusion and transport of ions such as hydrogen ions and hydroxyl ions, 5) permeable to the diffusion of a liquid electrolyte, and 6) a barrier to the gas phase $H_2$ on one side of the anode and the electrolyte on the other side. All of the aforementioned properties are desirable properties for using the catalytic material of the present invention as the active material for a fuel cell anode.

It is noted that the catalytic materials of the present invention may also include disordered catalytic materials. Examples of disordered materials are provided in U.S. Pat. No. 4,487,818, the contents of which are incorporated by reference.

Generally, the catalytic material of the present invention may be used as the active material for the anode of any fuel cell. Examples of fuel cells include proton exchange membrane fuel cells (PEM), alkaline fuel cells (AFC), phosphoric acid fuel cells (PAFC), molten carbonate fuel cells (MCFC), and solid oxide fuel cells (SOFC). In all cases, while the electrolyte and sub-reactions can be different, the basic point of $H_2$ gas dissociation to form water with release of current, in a hostile environment is common.

In one embodiment, the catalytic material may be used as the active material for the anode of an alkaline fuel cell. As shown in FIG. 5, an alkaline fuel cell 20 comprises an anode 24, a cathode 26 and an alkaline electrolyte 22 held within a porous non-conducting matrix between the anode 24 and the cathode 26. Potassium hydroxide is typically used as the alkaline electrolyte in an alkaline fuel cell. The anode 24 comprises a conductive substrate 24A and an anode layer 24B layer supported on the substrate 24A. The cathode 26 comprises a conductive substrate 26A and a cathode layer 26B support on the substrate 26A.

A hydrogen gas is fed to the anode 24 and an oxygen gas is fed to the cathode 26. In the embodiment shown, the hydrogen gas is fed to the anode 24 via the hydrogen compartment 13, and the oxygen gas is fed to the cathode 26 via the oxygen/air compartment 17. The reactant gases diffuse through the electrodes to react with the electrolyte 22 in the presence of the catalyst to produce water, heat and electricity. At the anode 24 the hydrogen is electrochemically oxidized and give up electrons according to the reaction:

$$H_2(g)+2OH^-\rightarrow 2H_2O+2e^- \qquad (4)$$

The electrons so generated are conducted from the anode 24 through an external circuit to the cathode 26. At the cathode 26 electrons are electrochemically combined with the oxidant according to the reaction:

$$\tfrac{1}{2}O_2(g)+H_2O+2e^-\rightarrow 2OH^- \qquad (5)$$

A flow of hydroxyl ($OH^-$) ions through the electrolyte 22 completes the electrical circuit.

Figure 6:
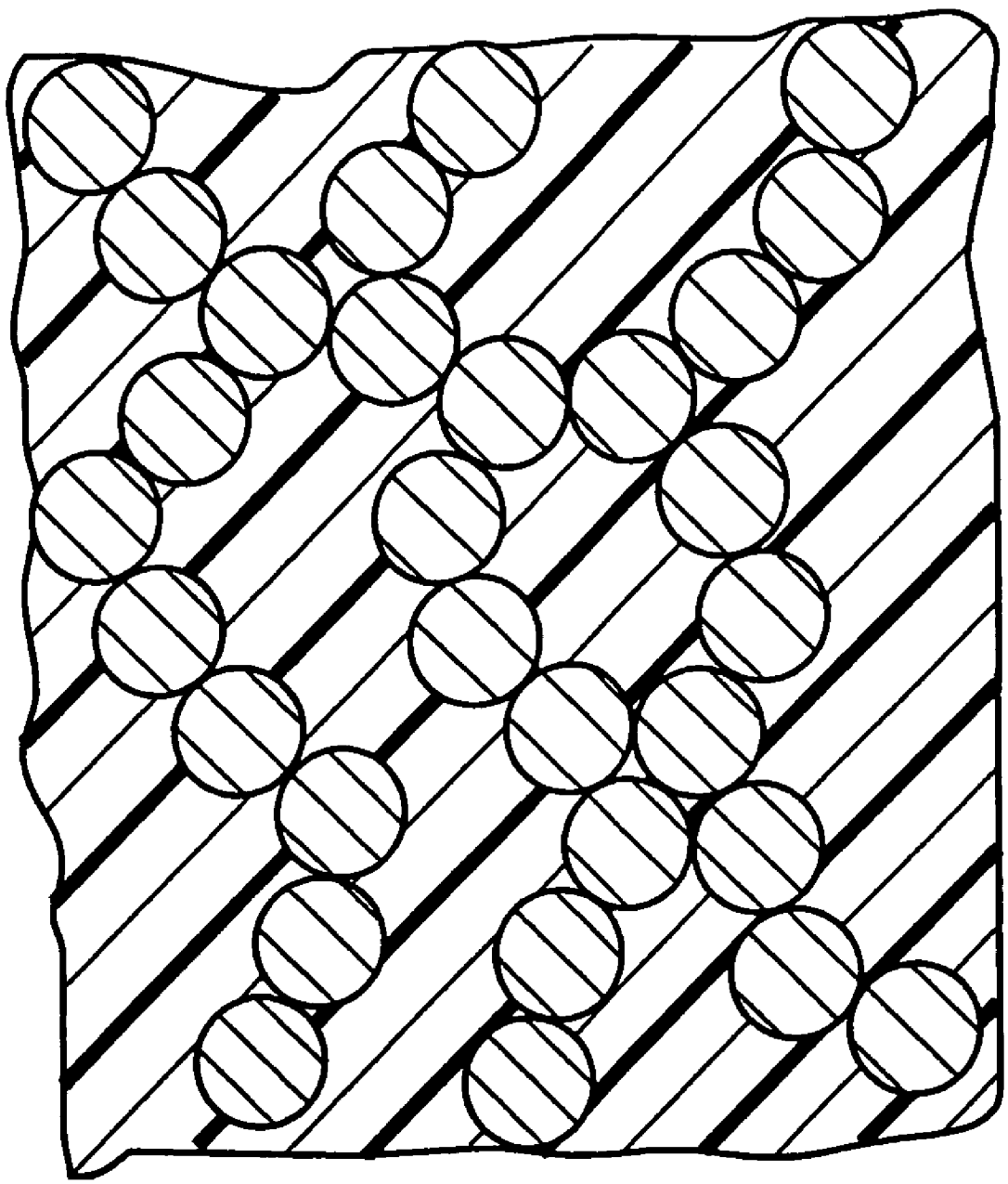
FIG. 6 is a diagram showing an example of an anode layer for an alkaline fuel cell comprising a catalyst and a hydrophobic material.

As discussed, the anode 24 comprises an anode layer 24B affixed to a conductive substrate 24A. FIG. 6 shows a detailed example of an embodiment of the anode layer 24B. Referring to FIG. 6, the anode layer 24B includes the instant catalytically active material 32 and a polymeric hydrophobic material 34. An example of a polymeric hydrophobic material is PTFE. The active material 32 may be intermixed with the hydrophobic material 34. The catalytically active material 32 forms a network of electrolyte-filled channels through the anode layer 24B. The above described electrochemical reactions occur at the surface of the catalytically active particles. The porous hydrophobic material 34 binds the anode layer 24B together and provides a network of channels through which reactant gases gain access to the catalytic surface of the active material 32. In an alternate embodiment, the hydrophobic material may be in the form of a hydrophobic layer (rather than being intermixed with the catalytic material). The hydrophobic layer may be placed adjacent to a catalyst layer. The catalyst layer may be in the form of catalytic material which is affixed to a conductive substrate.

In another embodiment, the catalytically active material of the present invention may be used as the active material for the anode of a proton exchange member (PEM) fuel cell. A PEM fuel cell is described in detail in U.S. Pat. No. 5,234,777, the disclosure of which is incorporated herein by reference. A PEM fuel cell uses a proton exchange membrane (also known as a solid polymer electrolyte) to provide ion exchange between the cathode and anode electrodes. The anode and cathode electrochemical reactions for a proton exchange membrane (PEM) fuel cell are as follows:

$$H_2(g) \rightarrow 2H^+ + 2e- \qquad (6)$$

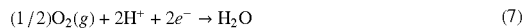

$$(1/2)O_2(g) + 2H^+ + 2e^- \rightarrow H_2O \qquad (7)$$

Like the anode reaction of the alkaline fuel, the alkaline reaction for a PEM fuel cell also involves the oxidation of the hydrogen gas fuel. For the PEM fuel cell, the electrical circuit of the fuel cell is completed by positive ion movement in the form of a hydrogen atom from the anode to the cathode (in contrast to the alkaline fuel cell where there is negative ion movement in the form of a hydroxyl ion from cathode to anode.

Like the anode of the alkaline fuel cell, the anode of the PEM fuel cell also comprises an anode layer affixed to a conductive substrate. However, in the case of the PEM fuel cell, a hydrophobic material is not needed; hence, the anode layer may simply consist of the instant catalytically active material.

Relative comparisons of the efficiency of the present invention super catalysts versus that of platinum and palladium have not yet been done. It fact, it is still within the spirit and scope of the invention that even if worse than platinum and/or palladium, they may still be better. This is not only because these nickel catalysts are so much less expensive on a relative basis than either platinum or palladium, but also because the size and surface area can be made much smaller/higher respectively. The overall consequence is that the catalyst user has a higher available concentration per unit area of the catalyst available compared to either platinum or palladium. Further, the long term benefits other than cost may be the ability of these "ultra fine catalysts" to operate effectively in unusually hostile (i.e., poisoning) environments without degradation.

EXAMPLE 1

In this example, a nickel metal hydride (NiMH) rechargeable battery is chosen as the test bed to demonstrate the capability of hydrogen gas absorption of the current invention in a hostile gas environment. Raw materials with purity higher than 99% were mixed and loaded in a vacuum induction furnace, melted, and poured into a steel mold. The ingot was pulverized into a 200-mesh powder and compacted onto a metal substrate to form an electrode belt. The electrode was used as the negative electrode in conjunction with nickel hydroxide positive electrodes, separators, and a 30% KOH electrolyte to fabricate typical sealed NiMH rechargeable batteries.

The hydrogen storage alloy was activated under a heat treatment of 60° C. for five days. The surface of the activated alloy comprises a metal particulate embedded in a porous metal oxide. The oxide prevents further oxidation of the alloy and the porosity in the oxide make it possible for both gas and electrolyte to penetrate. The metal particulate, consisting essentially of substantially pure metallic nickel and/or a nickel alloy, contributes to the catalytic nature of the surface.

Figure 7:
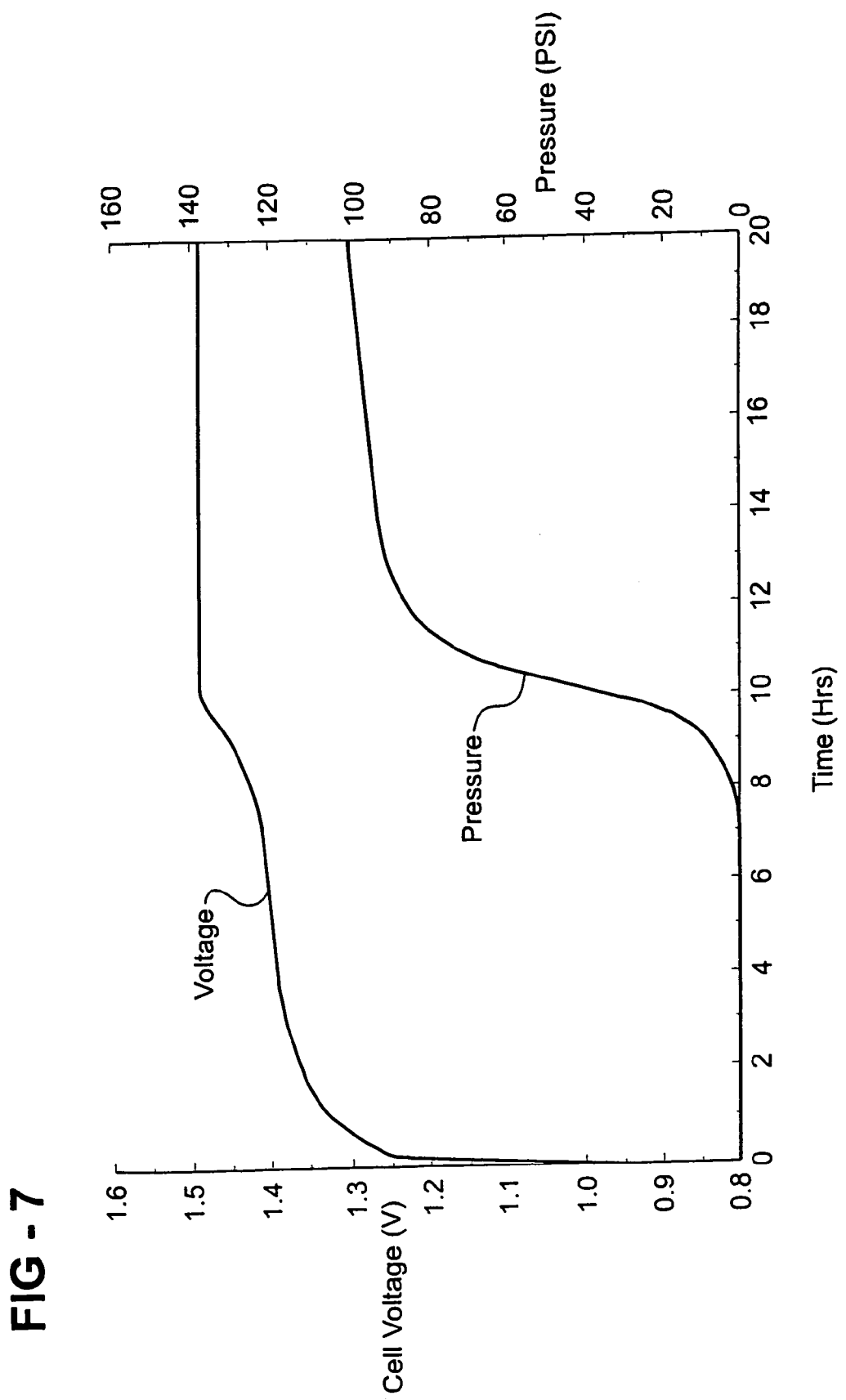
FIG. 7 is a diagram showing cell voltage and pressure versus time for a Ni-MH cell charged at C/10 rate for twenty hours.

The battery was charged under C/10 rate for 20 hours. The cell voltage and the cell pressure were monitored during the entire charge process (FIG. 7). It is clear from FIG. 7 that when the cell was charged close to its full capacity, the cell voltage started to increase from the 1.4 volt plateau to the 1.5 voltage overcharge plateau. The cell pressure also increased from 0 PSI to 100 PSI. A small sample of gas was withdrawn from the cell and the gas contents was determined by gas chromatograghy (GC) to be 96% $H_2$, 1% $O_2$, 2.5% $N_2$, and 0.5% $CH_4$. There are two possible mechanisms for this hydrogen domination phenomenon. The first one is the local heating of the hydrogen storage alloy due to the hydrogen-oxygen recombination and dehydride part of the charged negative electrode. The second possible mechanism is the lowering in the hydrogen gas evolution potential in the negative electrode due to the presence of oxygen evolved from the positive electrode during overcharge.

Figure 8:
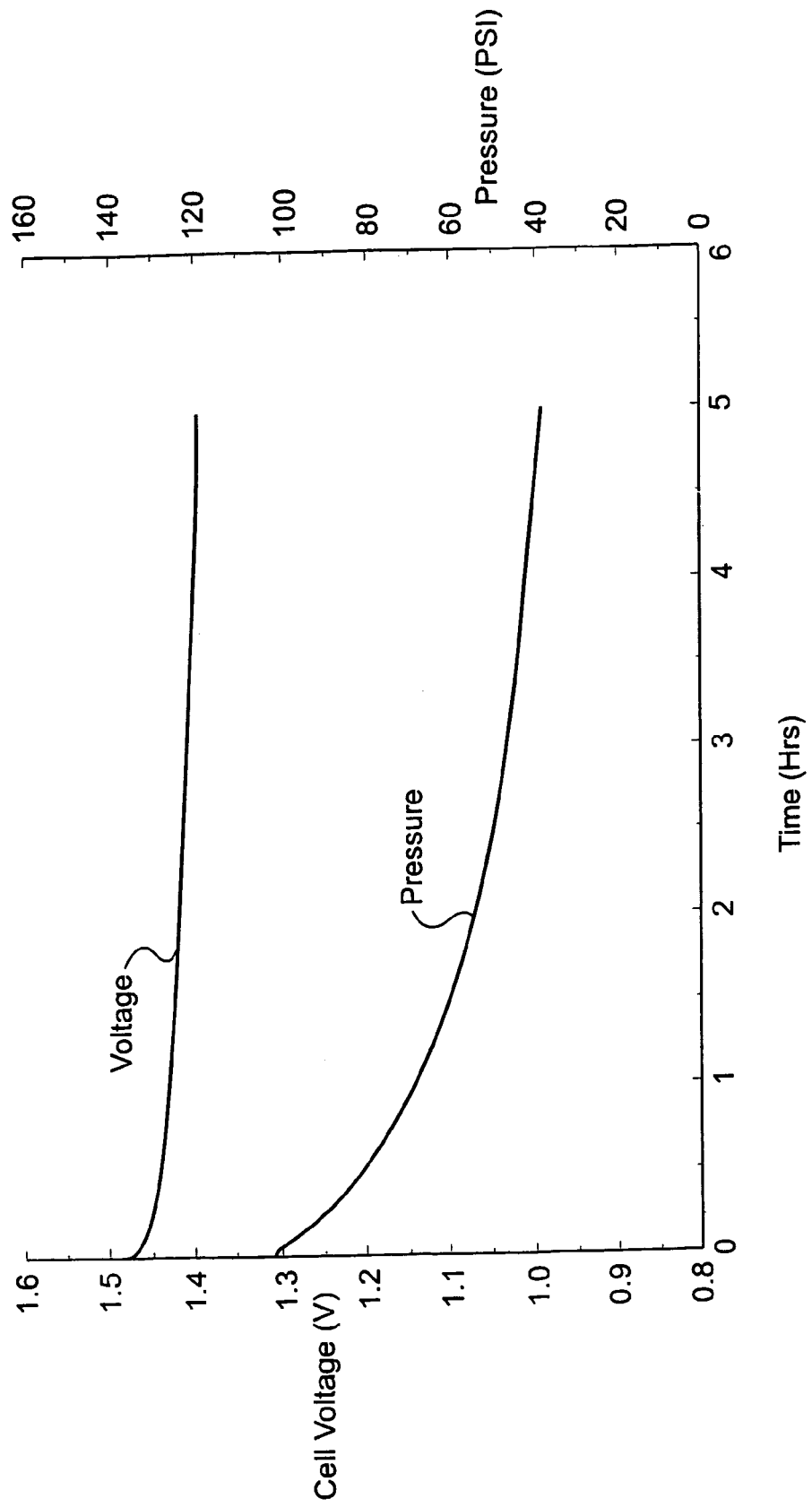
FIG. 8 is a diagram showing cell voltage and pressure versus time for the Ni-MH cell of FIG. 7, with the cell kept idle in the open configuration for five hours.

After the cell was charged to 200% of its rated capacity, it was left idle in the open-circuit configuration for five hours. The cell voltage and cell pressure were monitored again during this resting period (FIG. 8). The cell pressure went down from 100 PSI to less than 40 PSI in about five hours due to the hydrogen gas absorption into the negative electrode demonstrating that the activated surface of the hydrogen storage alloy acts as a catalyst effective to facilitate the decomposition of molecular hydrogen into atomic hydrogen. The atomic hydrogen is absorbed into the bulk of the hydrogen storage alloy either under presence of hostile gas species, such as oxygen and other carbon-containing gas.

EXAMPLE 2

Figure 9:
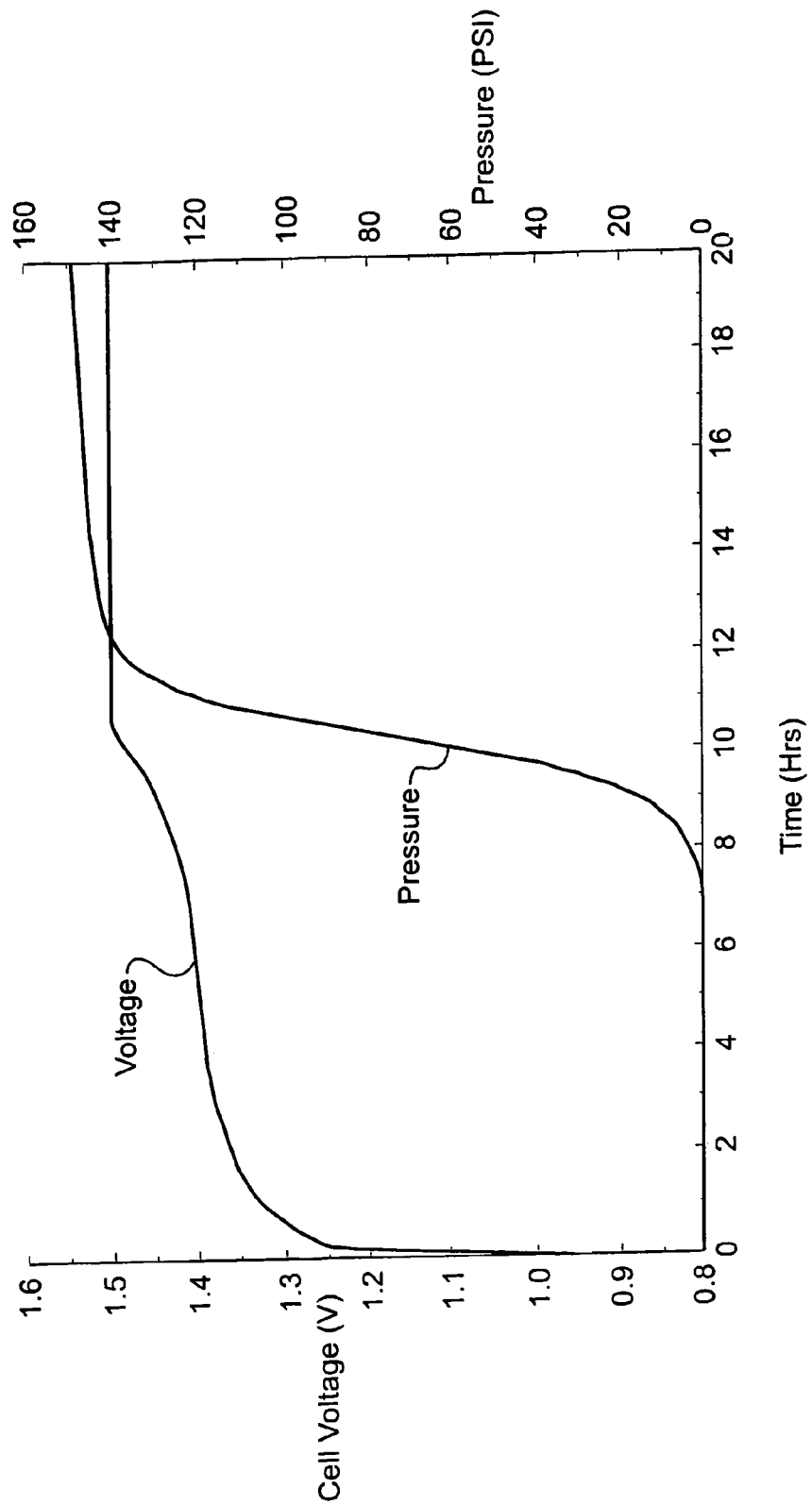
FIG. 9 is a diagram showing cell voltage and pressure versus time for a Ni-MH cell charged and discharge after multicycling and then charged at C/10 rate for twenty hours.
Figure 10:
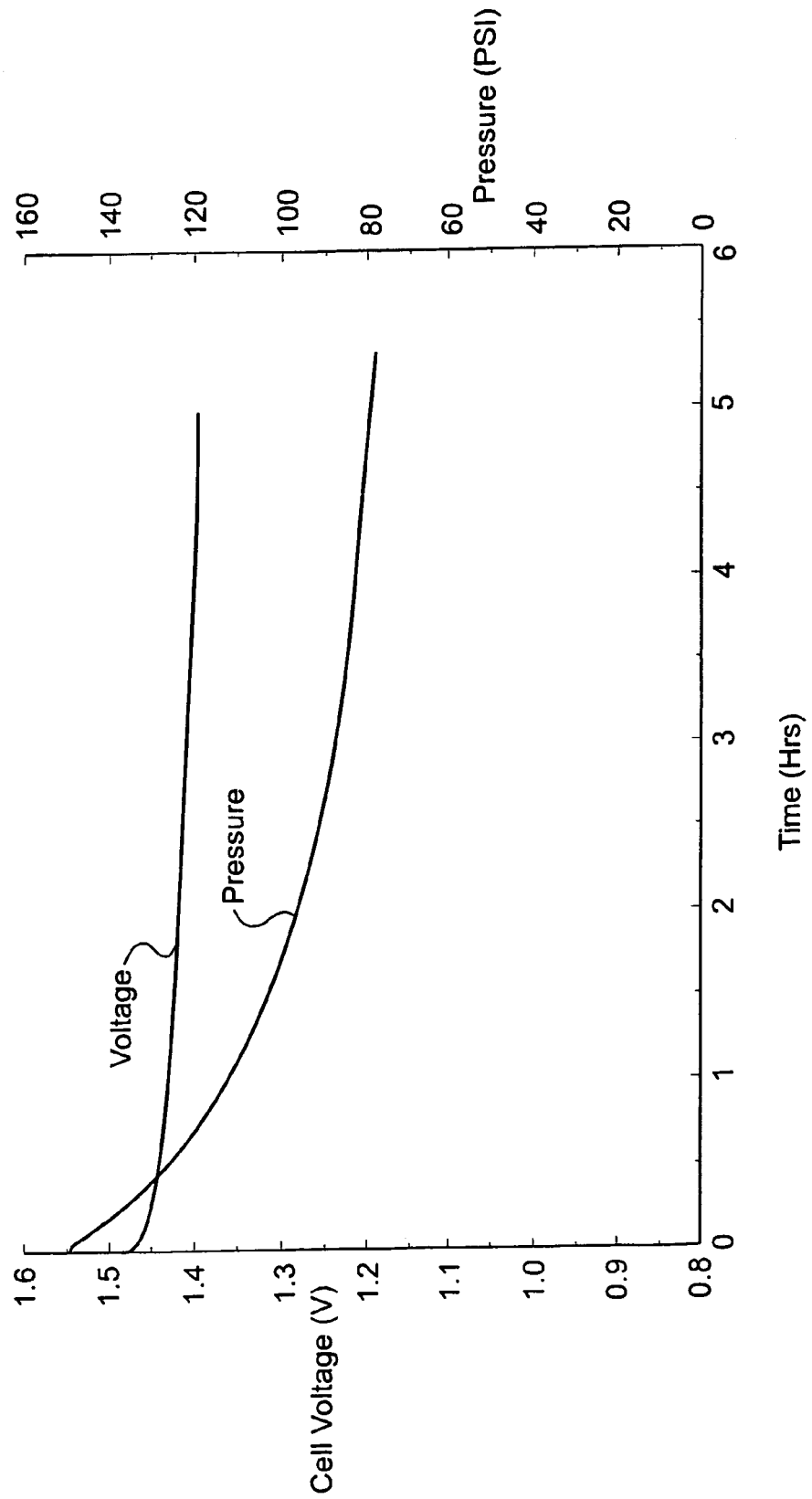
FIG. 10 is a diagram showing cell voltage and pressure versus time for the Ni-MH cell of FIG. 9, with the cell kept in open circuit in the open configuration for five hours.

An identical NiMH battery as used in Example 1 was charged and discharged 500 times. The heavily cycled battery was then charged under C/10 rate for 20 hours. The cell voltage and pressure were monitored during the entire charge process (FIG. 9). As shown in FIG. 9, the cell pressure increased from 0 PSI to 150 PSI. A small sample of gas was withdrawn from the cell and the gas content determined by gas chromatography (GC) was 96.3% $H_2$, 0.4% $O_2$, and 3.3% $N_2$. After the cell was charged to 200% of its rated capacity, it was left idle in the open-circuit configuration for five hours. The cell voltage and pressure were monitored during this open circuit period (FIG. 10). The cell pressure decreased from 150 PSI to less than 80 PSI in about five hours demonstrating that, even after 315 cycles, the alloy surface was still able to act as a catalyst effective to decompose hydrogen gas into atomic hydrogen which could then be absorbed into the bulk of the hydrogen storage alloy material.

It is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

We claim:

1. A method for making a catalyst, comprising the steps of:
   providing alloy particles; and
   leaching at least 10,000 Angstroms of said alloy particles.

2. The method of claim 1, wherein said leaching step leaches at least 25% of the volume said alloy particles.

3. The method of claim 1, wherein said leaching step leaches at least 50% of the volume said alloy particles.

4. The method of claim 1, wherein said leaching step leaches a predominate portion of said alloy particles.

5. The method of claim 1, wherein said leaching step comprises the step of leaching substantially all of said alloy particles.

6. The method of claim 1, wherein said leaching step comprises the step of converting said alloy to at least one material selected from the group consisting of oxides, phosphides, chlorides, suicides, carbides, sulfides, and mixtures thereof.

7. The method of claim 1, wherein said leaching step comprises the step of oxidizing said alloy particles.

8. The method of claim 1, wherein said leaching step comprises the step of:
contacting said alloy particles with an alkaline material.

9. The method of claim 8, wherein said alkaline material comprises an alkali metal hydroxide.

10. The method of claim 9, wherein said alkali metal hydroxide is selected from the group consisting of potassium hydroxide, sodium hydroxide, lithium hydroxide, and mixtures thereof.

11. The method of claim 1, wherein said leaching step comprises the step of:
contacting said alloy particles with an acidic material.

12. The method of claim 1, wherein said leaching step comprises the steps of:
contacting said alloy particles with an alkaline material; and
contacting said alloy particles with an acidic material.

13. The method of claim 12, wherein said acidic material comprises an acid selected from the group consisting of HF, HCl, $HNO_3$, $H_2SO_4$, and mixtures thereof.

14. The method of claim 1, wherein said leaching step comprises the step of:
alternatingly contacting said alloy particles with alkaline and acidic materials.

15. The method of claim 1, wherein said leaching step is chemical leaching.

16. The method of claim 1, wherein said leaching step is electrochemical leaching.

17. The method of claim 1, wherein said alloy particles are hydrogen storage alloy particles.

18. The method of claim 1, wherein said catalyst is a catalyst powder comprising a nickel or nickel alloy particulate having an average particle size of between about 10 Angstroms and about 70 Angstroms dispersed in a support matrix, said power formed predominantly of its nickel or nickel alloy particulate and support matrix.

19. The method of claim 1, wherein said leaching step leaches less than the entire volume of said alloy particles.

* * * * *